US006574217B1

(12) United States Patent
Lewis et al.

(10) Patent No.: US 6,574,217 B1
(45) Date of Patent: Jun. 3, 2003

(54) TELECOMMUNICATIONS SWITCH FOR PROVIDING TELEPHONY TRAFFIC INTEGRATED WITH VIDEO INFORMATION SERVICES

(75) Inventors: Stephen Lewis, Napa, CA (US); K. Martin Stevenson, III, San Rafael, CA (US); Farzad S. Nabavi, Union City, CA (US); Catherine A. Millet, Petaluma, CA (US); Jason Dove, Petaluma, CA (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 08/980,271

(22) Filed: Nov. 26, 1997

Related U.S. Application Data

(60) Provisional application No. 60/031,895, filed on Nov. 27, 1996.

(51) Int. Cl.[7] .............................................. H04L 12/64
(52) U.S. Cl. ....................................... 370/352; 370/465
(58) Field of Search ................................. 370/352, 353, 370/354, 465, 466, 474, 476

(56) References Cited

U.S. PATENT DOCUMENTS

| | | | | |
|---|---|---|---|---|
| 4,903,261 A | * | 2/1990 | Baran et al. ................. | 370/396 |
| 5,341,374 A | | 8/1994 | Lewen et al. ............... | 370/85.4 |
| 5,341,376 A | * | 8/1994 | Yamashita ................... | 370/466 |
| 5,345,445 A | * | 9/1994 | Hiller et al. ................. | 370/358 |
| 5,355,362 A | | 10/1994 | Gorshe et al. ............... | 370/16.1 |
| 5,526,349 A | * | 6/1996 | Diaz et al. ................... | 370/474 |
| 5,526,359 A | * | 6/1996 | Read et al. .................. | 370/516 |
| 5,534,912 A | * | 7/1996 | Kostreski .................... | 725/106 |
| 5,539,449 A | * | 7/1996 | Blahut et al. ................ | 370/396 |
| 5,570,355 A | * | 10/1996 | Dail et al. .................... | 370/352 |
| 5,576,874 A | * | 11/1996 | Czerwiec et al. ........... | 359/123 |
| 5,592,477 A | * | 1/1997 | Farris et al. ................. | 370/396 |
| 5,608,447 A | * | 3/1997 | Farry et al. .................. | 725/116 |
| 5,756,280 A | * | 5/1998 | Soora et al. ................. | 455/4.2 |
| 5,831,979 A | * | 11/1998 | Byers .......................... | 370/360 |
| 5,842,111 A | * | 11/1998 | Byers .......................... | 455/6.3 |
| 5,917,815 A | * | 6/1999 | Byers et al. ................. | 370/352 |
| 5,926,472 A | * | 7/1999 | Byers .......................... | 370/360 |
| 5,949,791 A | * | 9/1999 | Byers et al. ................. | 370/466 |
| 5,953,344 A | * | 9/1999 | Dail et al. .................... | 370/443 |

FOREIGN PATENT DOCUMENTS

WO              9535008             12/1995

* cited by examiner

Primary Examiner—Min Jung
(74) Attorney, Agent, or Firm—V. Lawrence Sewell; Baker Botts

(57) ABSTRACT

A telephony and video telecommunications distribution network (10) includes a broadband fiber bank section (32) within a digital loop carrier system (22). The broadband fiber bank section (32) receives video information from a stored video information provider (12) through a broadband asynchronous transfer mode switch (18). The video information is received in an asynchronous transfer mode cell format. The digital loop carrier system (22) receives telephony traffic from a telephony network (24) at a common control section (28). The common control section (28) passes the telephony traffic to the broadband fiber bank section (32) where it is converted into asynchronous transfer mode cell form. The broadband fiber bank section (32) multiplexes video asynchronous transfer mode cells and telephony asynchronous transfer mode cells for transport to an optical network unit (40) over a fiber optic communication link (38).

12 Claims, 6 Drawing Sheets

TELECOMMUNICATIONS SWITCH FOR PROVIDING TELEPHONY TRAFFIC INTEGRATED WITH VIDEO INFORMATION SERVICES

CROSS REFERENCE TO RELATED APPLICATIONS

This application claims the benefit of U.S. Provisional Application No. 60/031,895 filed on Nov. 27, 1996.

TECHNICAL FIELD OF THE INVENTION

The present invention relates in general to telecommunications networks and more particularly to a telecommunications switch for providing telephony traffic integrated with video information services.

BACKGROUND OF THE INVENTION

Over the past decade, telephone companies have been confronted with increasing competition for their core businesses. Revenues from telephone services are either flat or in a declining state. In order to improve profit margins, telephone companies have dramatically reduced staff levels and diversified their businesses to reduce their reliance on telephone service profits. Telephone companies desire to expand revenue opportunities through the offering of new services. The most significant new service with respect to the residential customer is the delivery of video services such: as analog multicast, digital multicast, and switched digital capabilities. Telephone companies look to gain a share of the cable television and video cassette rental revenue streams and to grow the total available market through successful marketing and distribution of new on-demand video services. Therefore, it is desirable that video services can be provided by telephone companies along with telephony services that are currently offered.

SUMMARY OF THE INVENTION

From the foregoing, it may be appreciated that a need has arisen for a telecommunications switch that can provide both telephony traffic and video information. In accordance with the present invention, a telecommunications switch for providing telephony traffic integrated with video information services is provided that substantially eliminates or reduces disadvantages and problems associated with conventional telecommunications switches.

According to an embodiment of the present invention, there is provided a telecommunications switch that includes a common control section for processing telephony traffic received from a telephony network. The telecommunications switch also includes a broadband fiber bank section that receives video information carried in asynchronous transfer mode cells from a video information provider. The common control section provides telephony traffic to the broadband fiber bank section. The broadband fiber bank section places the telephony traffic into asynchronous transfer mode cells and multiplexes telephony asynchronous transfer mode cells with video asynchronous,transfer mode cells for transport to an optical network unit.

The present invention provides various technical advantages over convention telecommunications switches. For example, one technical advantage is to integrate telephony traffic and video information. Another technical advantage is to place telephony traffic into asynchronous transfer mode cells for multiplexing with video asynchronous transfer mode cells. Yet another technical advantage is to integrate video services into a conventional telecommunications switch. Other technical advantages are readily apparent to one skilled in the art from the following figures, description and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
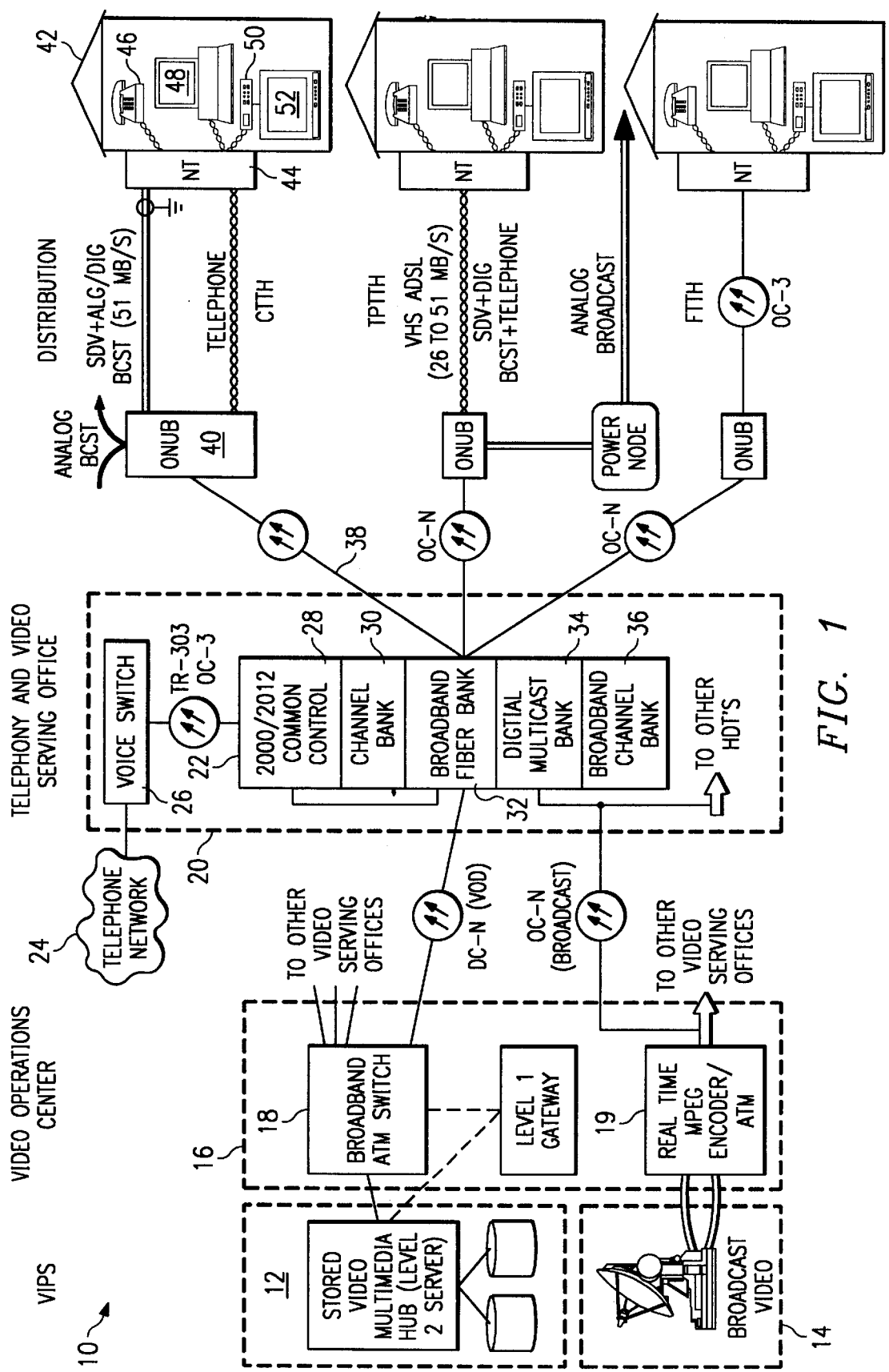
FIG. 1 illustrates a block diagram of a telephony and video telecommunications distribution network.

FIG. 1 is a block diagram of a telephony and video telecommunications distribution network 10. Telephony and video telecommunication distribution network 10 includes a stored video information provider 12 and a broadcast video information provider 14 that each generate video signals. Video signals generated by stored video information provider 12 and broadcast video information provider 14 are transferred to a video operation center 16. Video operation center 16 includes a broadband asynchronous transfer mode switch 18 that receives switched digital video signals from stored video information provider 12. Broadband asynchronous transfer mode switch 18 places the switched digital video signals into asynchronous transfer mode cells for transfer to a telephony and video serving office 20. Similarly, video operation center 16 includes a real-time motion picture experts group encoder 19 that receives broadcast digital video signals from broadcast video information provider 14. Real-time motion picture experts group encoder 19 places the broadcast digital video signals into asynchronous transfer mode cells for transfer to telephony and video serving office 20.

Telephony and video serving office 20 includes a digital loop carrier system 22 that receives switched digital video information from broadband asynchronous transfer mode switch 18, broadcast digital video information from real-time motion pictures experts group encoder 19, and telephony traffic from a telephone network 24 through a voice switch 26. Digital loop carrier system 22 includes a common control section 28, a channel bank section 30, a broadband fiber bank section 32, a digital multicast bank section 34, and a broadband channel bank section 36.

Common control section 28 provides processing, control, memory, craft interfaces, and operating system interfaces in order to control telephony and video traffic through each section of digital loop carrier system 22. Narrowband channel bank section 30 provides for the processing of telephony only traffic for local and remote customers. Broadband fiber bank section 32 receives switched digital video signals from broadband asynchronous transfer mode switch 18 and telephony signals from common control section 28 in order to provide integrated video and telephony information transfer. Digital multicast bank 34 terminates the broadcast digital video information from real-time motion pictures expert group encoder 19 for delivery to broadband fiber bank section 32. Though shown as terminating on separate sections, the switched digital video signals and broadcast digital video signals could terminate on the same section of digital loop carrier system 22. Separate termination provides flexibility to respond to the needs and requirements of the area serviced by digital loop carrier system 22. Broadband channel bank 36 provides for the delivery of video information to customers in the local area of digital loop carrier system 22 as provided by broadband fiber bank section 32.

For remote delivery of video and telephony information, broadband fiber bank section 32 places telephony information into telephony asynchronous transfer mode cells and video information into video asynchronous transfer mode cells. Telephony asynchronous transfer mode cells and video asynchronous transfer mode cells are multiplexed onto optical fiber links 38 for distribution to optical network units 40. Optical network units 40 may provide cable to the home, twisted pair to the home, and fiber to the home distribution capability to provide for the delivery of telephony and video information to a customer 42 through a network termination unit 44 for operation of telephones 46, computers 48, and other office machines, and set top boxes 50 for television monitors 52. Telephony and video control information may be generated at customers 42 and appropriately transferred through a return path for processing by telephony and video telecommunications distribution network 10.

Figure 2:
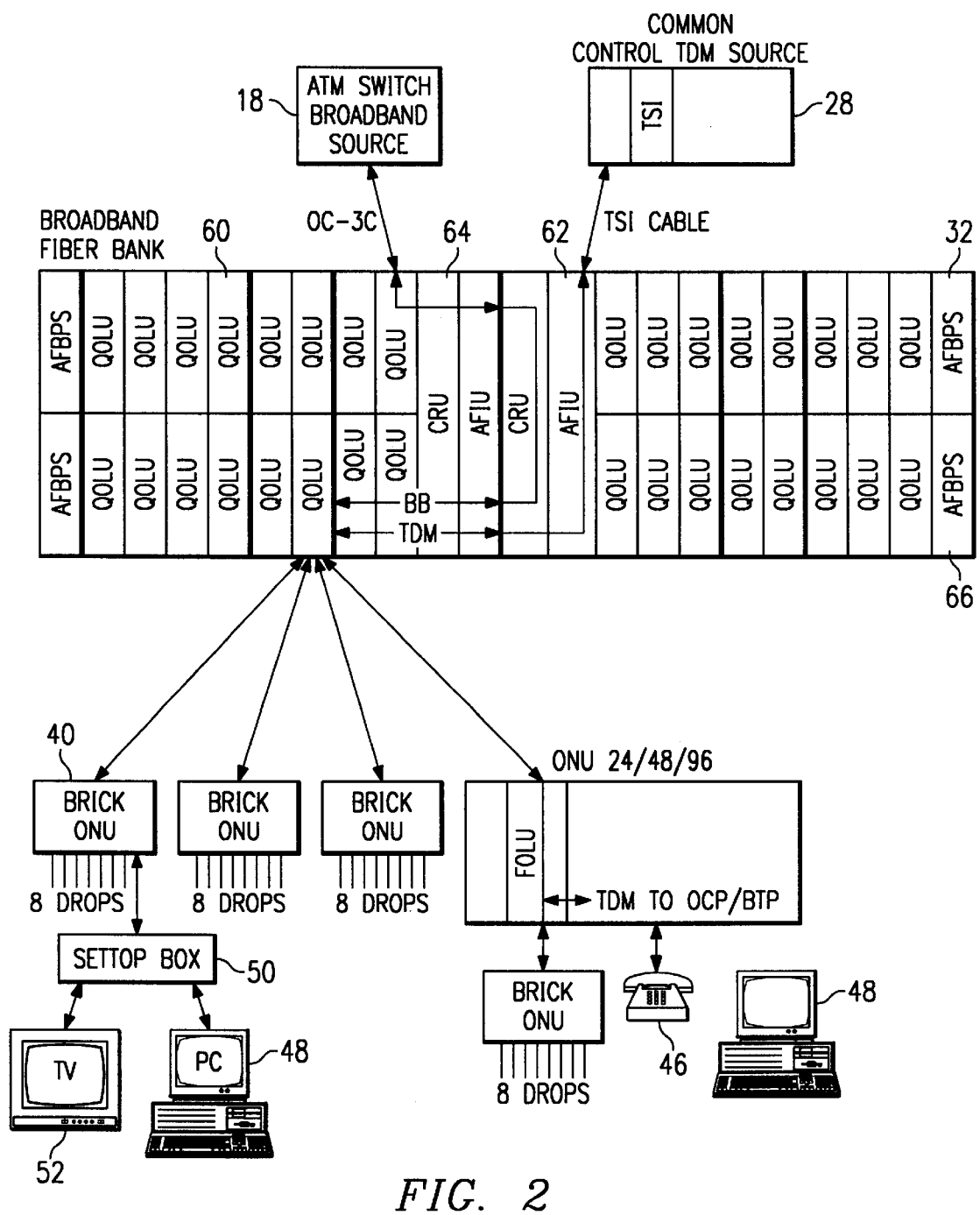
FIG. 2 illustrates a block diagram showing information flow through a broadband fiber bank section within a telecommunications switch of the telephony and video telecommunications distribution network.

FIG. 2 is a block diagram showing a simplified information flow through broadband fiber bank section 32. Broadband fiber bank section 32 includes a plurality of optical line units 60, redundant fiber bank interface units 62, and redundant cell routing units 64. Operating power is provided to broadband fiver bank section 32 through a fiber bank power supply 66. A fiber bank backplane 68 provides the interconnections for each unit of broadband fiber link section 32. Optical line units 60 provide an optical interface between broadband fiber bank section 32 and a video information source such as broadband asynchronous transfer mode switch 18. Optical line unit 60 also provides an interface between broadband fiber bank section 32 and a variety of optical network unit 40 configurations. Cell routing unit 64 provides an asynchronous transfer mode switching fabric and asynchronous transfer mode cell distribution function for broadband fiber bank section 32. Fiber bank interface unit 62 provides a time slot interchange communication interface for the delivery of telephony traffic between common control section 28 and optical line unit 60.

Video information in asynchronous transfer mode cells is received from broadband asynchronous transfer mode switch 18 at optical line unit 60. Optical line unit 60 transfers the video asynchronous transfer mode cells to cell routing unit 64 for appropriate switching to an output optical line unit 60. Time division multiplexed telephony traffic is received from a time slot interchanger 69 of common control section 28 at fiber bank interface unit 62. The narrowband telephony traffic is routed through fiber bank interface unit 62 to the appropriate output optical line unit 60. Output optical line unit 60 places the narrowband telephony traffic into asynchronous transfer mode cells and multiplexes the generated telephony asynchronous transfer mode cells with the video asynchronous transfer mode cells received from cell routing unit 64 for distribution to optical network units 40. Optical network units 40 distribute video information from the video asynchronous transfer mode cells to television 52 and/or computer 48 through set top box 50. Optical network units 40 also provide telephony traffic from telephony asynchronous transfer mode cells to telephone 46 and computer 48. For more information on the operation of optical network units 40 and the different configurations thereof, please refer to co-pending U.S. patent application Ser. No. 08/978,969, entitled "Optical Network Unit for Communicating Telephony and Video Information", which is hereby incorporated by reference herein.

Figure 3:
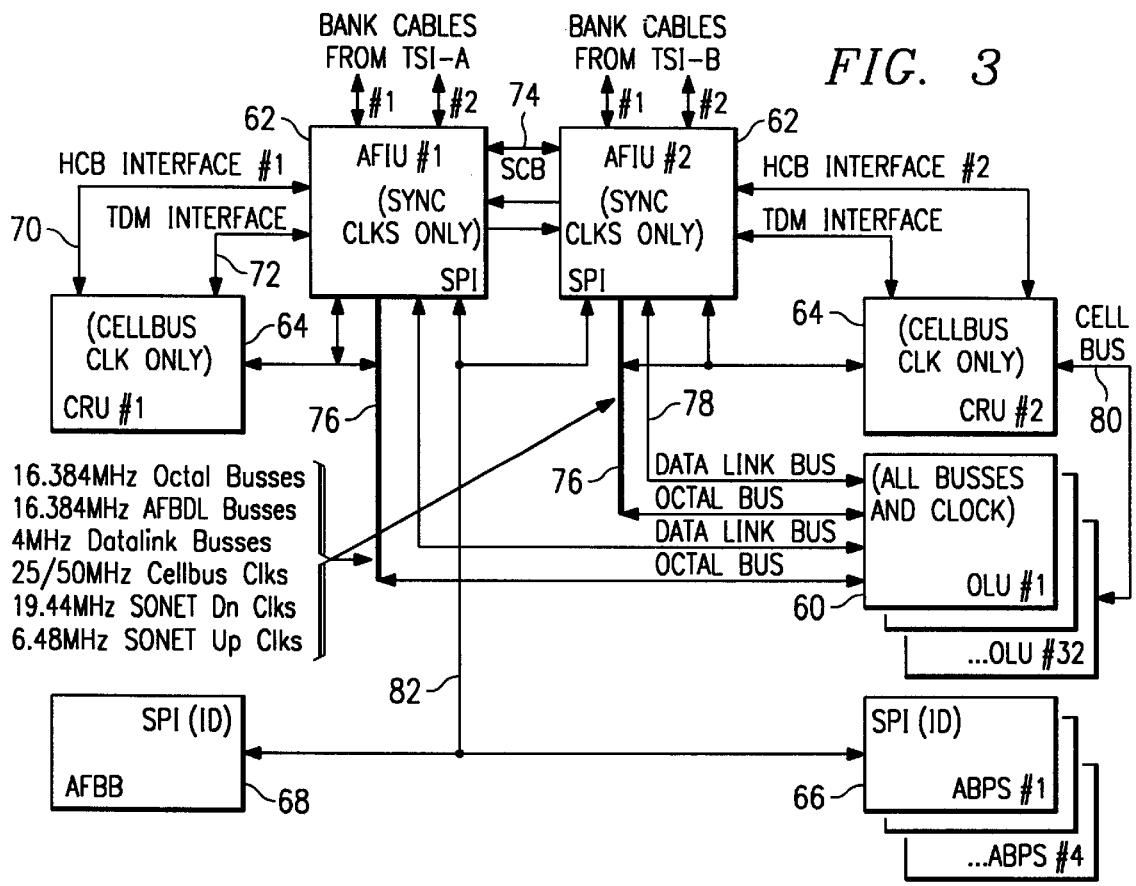
FIG. 3 illustrates a block diagram of the broadband fiber bank section.

FIG. 3 is a simplified block diagram of the interconnections between each unit within broadband fiber bank section 32. Fiber bank interface units 62 terminate signals from time slot interchangers 69 within common control section 28. A host control bus interface 70 allows for communications between fiber bank interface unit 62 and cell routing unit 64. A TDM interface 72 is also provided between fiber bank interface unit 62 and cell routing unit 64. Redundant fiber bank interface units 62 communicate with each other over a simplex control bus 74. Telephony traffic is transferred between fiber bank interface unit 62 and optical line unit 60 over an octal bus 76. Control and interrupt communications between fiber bank interface unit 62 and optical line unit 60 are carried over a datalink bus 78. Video traffic is carried between cell routing units 64 and optical line units 60 over a cell bus 80. Fiber bank interface unit 62 communicates with fiber bank power supply unit 66 over a serial peripheral interface 82. Fiber bank back plane 68 provides the distribution network for all the clock and synchronization signals as well as the buses and communication links discussed above between each unit within broadband fiber bank section 32.

Figure 4:
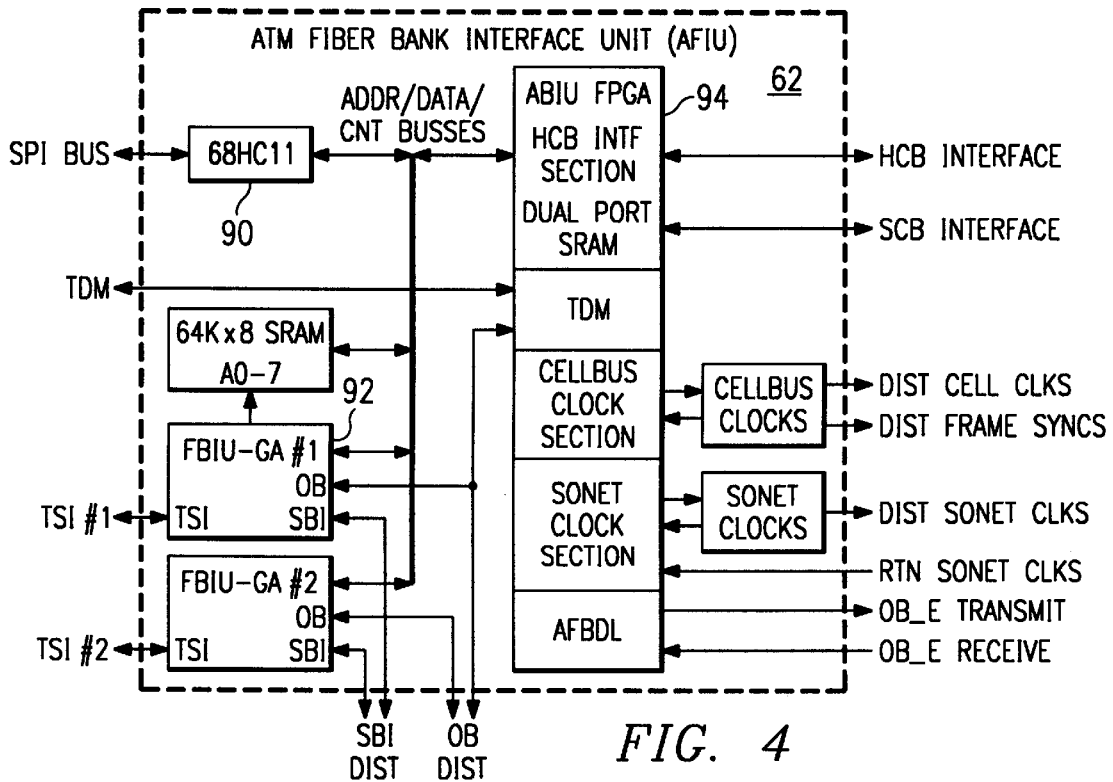
FIG. 4 illustrates a block diagram of a fiber bank interface unit of the broadband fiber bank section.

FIG. 4 is a block diagram of fiber bank interface unit 62. Fiber bank interface unit 62 includes a processor unit 90, time slot interchange interface units 92, and a programmable gate array unit 94. Processor unit 90 provides the supervision and control for fiber bank unit 62. Time slot interchange interface units 92 terminate telephony data between fiber bank interface unit 62 and time slot interchangers 69 of common control section 28. Thirty-two subscriber bus interface signals and thirty-two octal bus signals are extracted from the time slot interchange signals. The subscriber bus interface signals carry control signals that are distributed to optical line unit 60. The octal bus signals carry the telephony traffic that is distributed to optical line units 60. Programmable gate array unit 94 provides control links for communications with cell routing unit 64 and optical line unit 60. Programmable gate array unit 94 also distributes cell bus clocks to optical line units 60 and cell routing units 62 and synchronous optical network clocks to optical line unit 60.

Figure 5:
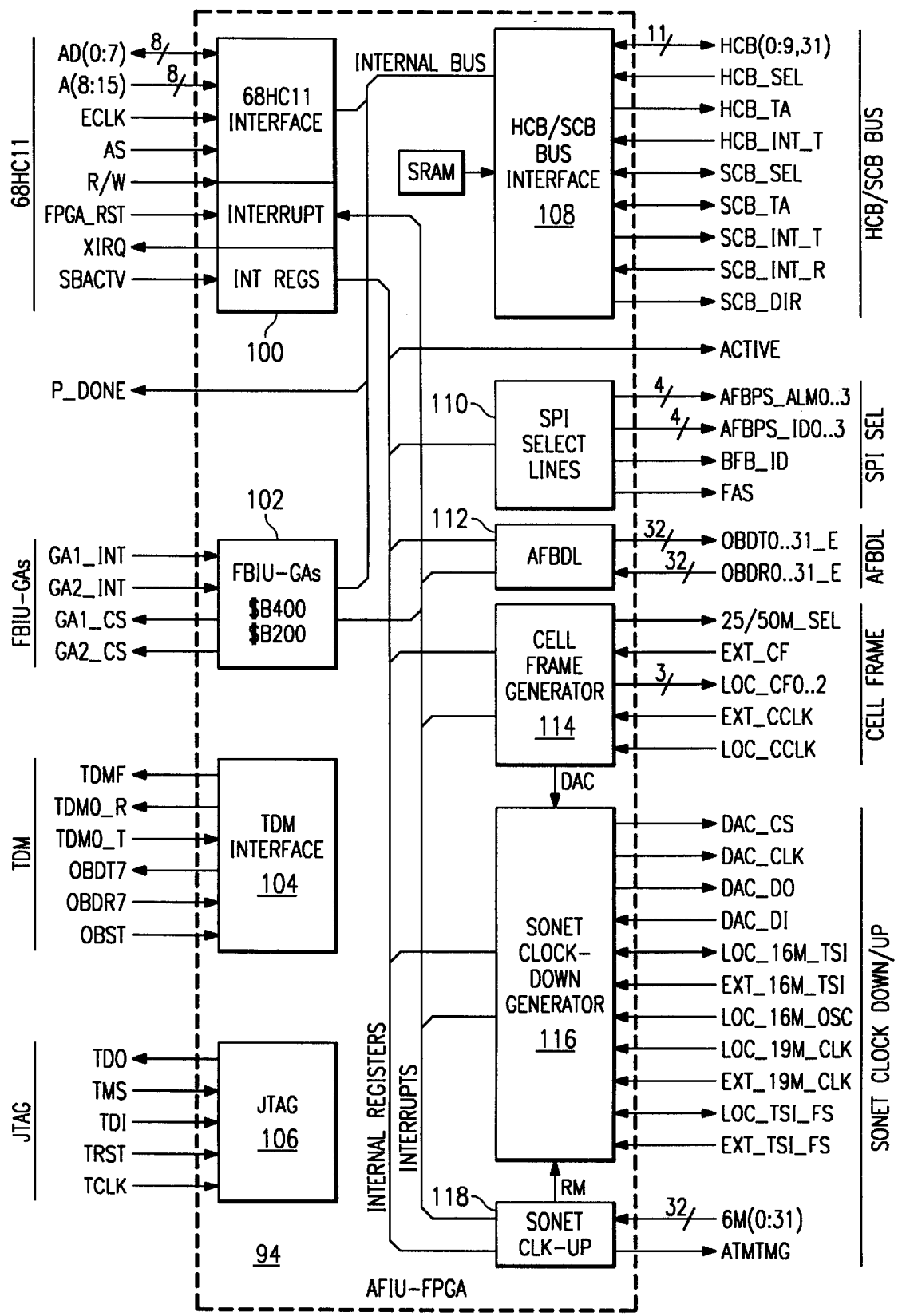
FIG. 5 illustrates a block diagram of a programmable gate array within the fiber bank interface unit.

FIG. 5 is a block diagram of programmable gate array 94. Programmable gate array unit 94 includes a processor interface 100 that allows programmable gate array unit 94 to communicate with processor unit 90 and a gate array interface 102 provides communications with time slot interchanger interface unit 92. A time division multiplex interface 104 allows for time division multiplex communications with cell routing unit 64. Maintenance and test capability is performed through a JTAG unit 106. A host control bus interface 108 provides for the communications of control information between fiber bank interface unit 62 and cell routing units 64. Host control bus interface 108 also includes a simplex control bus that allows one cell routing unit 64 to communicate with both fiber bank interface units 62 within broadband fiber bank 32. A serial peripheral interface selector 110 provides the chip selects for fiber bank power supply 66 as controlled by processor unit 90 through processor interface 100. A fiber bank datalink interface 112 provides the capability for path layer messaging and code download from cell routing unit 64 through fiber bank interface unit 62.

A cell frame generator 114 generates and distributes a cell bus clock to optical line unit 60. A cell frame synchronization pulse is also distributed along with the cell bus clock. A cell bus clock is synthesized from a free-running 25 MHZ voltage controlled oscillator if fiber bank interface unit 62 is active. Otherwise, the redundant fiber bank interface unit 62 will frequency and phase lock with the cell bus clock synthesized from the active fiber bank interface unit 62. The cell frame synchronization pulse synthesizes every 68 cell clock cycles based on the local cell clock if the fiber bank interface unit 62 is in the active mode. Otherwise, the redundant fiber bank interface unit 62 phase locks its cell frame synchronization pulse to the cell frame synchronization pulse from the active fiber bank interface unit 62.

A SONET clock down generator 116 generates a SONET clock that is distributed to optical line unit 60. The SONET clock is synthesized from the 16.384 MHZ octal bus clock provided by time slot interchangers 69 of common control section 28. The redundant fiber bank interface unit 62 will frequency and phase lock its SONET clock with the SONET clock from the active fiber bank interface unit 62. A SONET clock up monitor receives SONET upstream clocks from optical line unit 60 and monitors them for integrity. One of the SONET upstream clocks is selected and a fractionalized SONET reference clock of 6.48 MHZ is transmitted to common control section 28 as TTL logic level balance line pairs.

Figure 6:
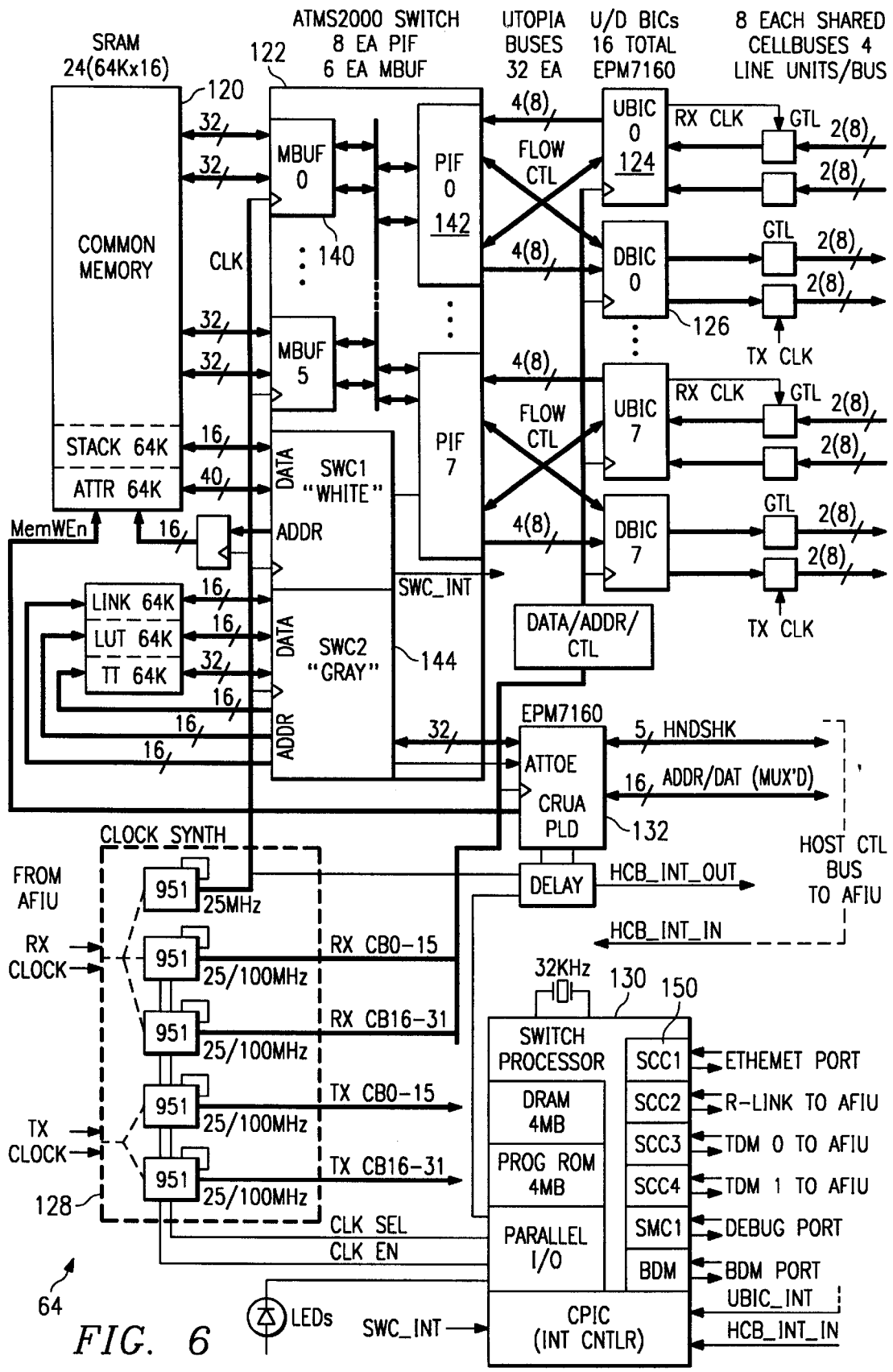
FIG. 6 illustrates a block diagram of a cell routing unit of the broadband fiber bank section.

FIG. 6 is a block diagram of cell routing unit 64. Cell routing unit 64 includes a common memory 120, a switch chip set 122, upstream bus interface controllers 124, downstream bus interface controllers 126, a clock synthesizer 128, a switch processor 130, and a cell routing unit programmable logic device 132. Common memory 120 queues all asynchronous transfer mode cell header, payload and switch-related attributes that is shared across all thirty-two ports of switch chip set 122. Queuing structures within common memory 120 are independent of data path and cell scheduling memory. Common memory 120 preferably stores asynchronous transfer mode cells in a 64K word deep and a 57 byte wide memory area implemented in a 64K by 16 asynchronous static random access memory.

Switch chip set 122 includes memory access buffers 140, port interfaces 142 and switch controllers 144. Memory access buffers 140 interface common memory 120 to port interfaces 142. Each memory access buffer 140 consists of two identical elements. Each memory access buffer 140 element interfaces bi-directional serial data from each of thirty-two cell bus ports through eight port interfaces into a 32-bit parallel word. The 32-bit words from memory access buffers 140 form the 48-byte wide payload word that is written to and read from common memory 120.

Port interfaces 142 provide a point-to-point connection from memory access buffers 140 to utopia buses coupled to upstream bus interface controllers 124 and downstream bus interface controllers 126. Eight port interfaces 142 through the eight upstream bus interface controllers 124 and downstream bus interface controllers 126 provide communications to thirty-two optical line units 60. Only payload information within asynchronous transfer mode cells are passed to and from memory access buffers 140. Header information within asynchronous transfer mode cells is transferred to and from switch controllers 144 over a dedicated serial interface. Port interfaces 142 include first in, first out buffers that queue payload data for asynchronous transfer mode cells.

Switch processor 130 has access to port interface 142 registers through switch controllers 144. Switch controllers 144 manage and maintain queues in common memory 120. Preferably, 130 queues are maintained—four for each of the thirty-two ports, one CPU queue for access by switch processor 130, and one reset queue which is used for returning used buffers back to the empty queue. Switch controllers 144 are also responsible for transferring cell header to and from port interfaces 142. Switch controllers 144 use this header information to access control and data structures. Switch controllers 144 also handle asynchronous transfer mode cells generated at switch processor 130.

Upstream bus interface controllers 124 and downstream bus interface controllers 126 provide the interface to cell bus 80 for the transfer of video asynchronous transfer mode cells between cell routing unit 64 and optical line unit 60. The cell bus is a full duplex 8 bit wide data path to and from optical line unit 60. The data rate of the cell bus is selectable to support various bandwidths of service. Upstream bus interface controllers 124 and downstream bus interface controllers 126 adapt the utopia bus protocol of port interface 140 to the cell bus protocol. Gunning transistor logic buffers 146 buffer and real-time signals to and from the cell bus.

Cell routing unit programmable logic device 132 controls the interface with fiber bank interface unit 62 over the host control bus, timing generation or common memory 120, include logic functions for cell routing unit 64. Switch processor 130 communicates over the host control bus with processor unit 90 of fiber bank interface unit 62 through a message buffer memory located at fiber bank interface unit 62. The host control bus interface appears an 8 bit slave to switched processor 130. This 8 bit data bus is multiplexed with a 16 bit address in one direction control bit into two phases, address phase and data phase. Six additional control signals are transported without multiplex for a total of 23 host control bus interface pins to a message queue at fiber bank interface unit 62. Clock synthesizer 128 provides the clock distribution for cell routing unit 64 in response to cell bus clocks received from fiber bank interface unit 62. Clock synthesizer 128 includes a series of phase lock loop drivers to generate the appropriate clock frequencies for cell routing unit 64.

Switch processor 130 is the main control processor within broadband fiber bank section 32. Switch processor 130 includes four independent serial communication controllers 150 that provide an Ethernet port, an R-Link port, and two TDM ports.

Figure 7:
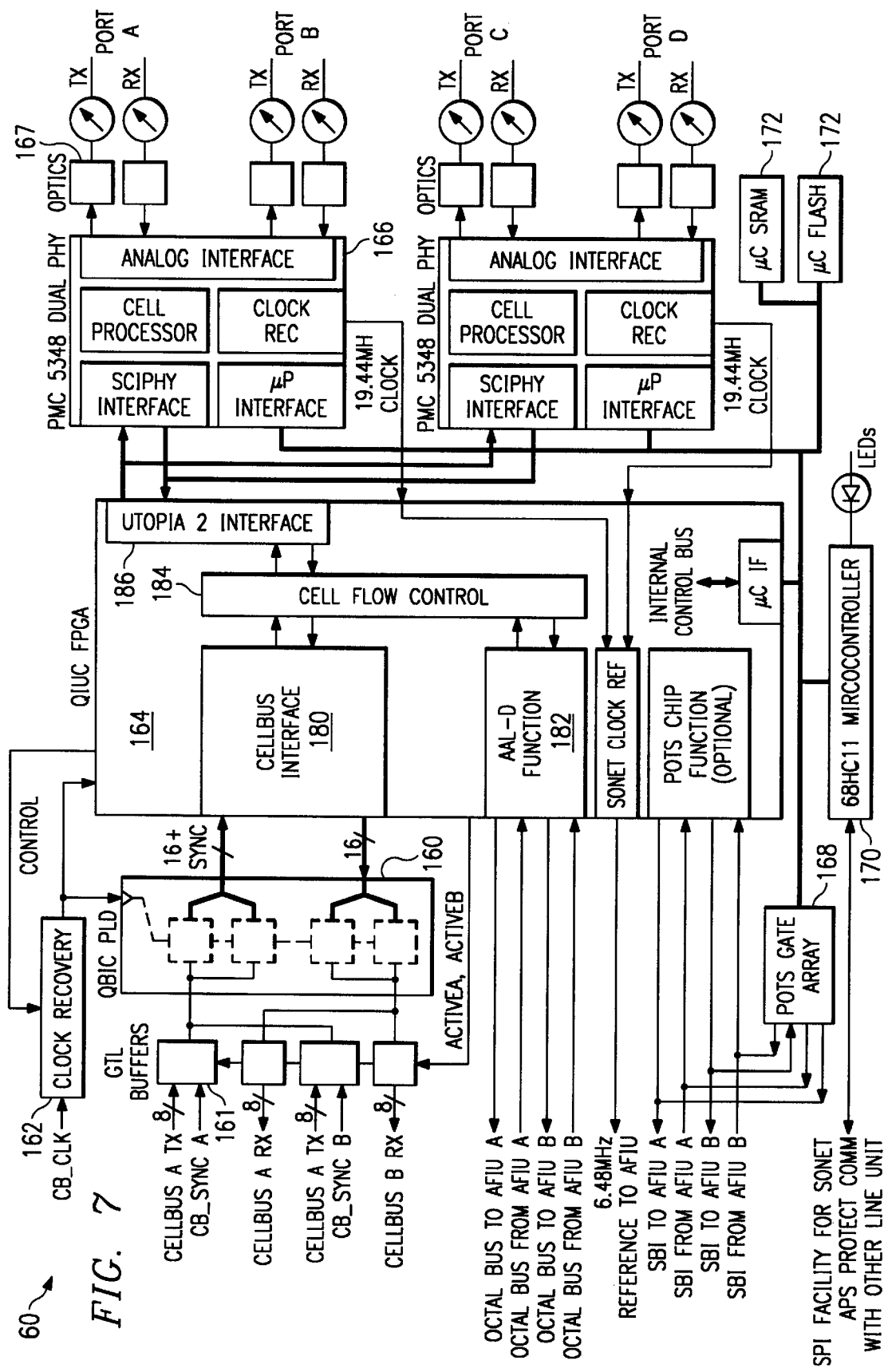
FIG. 7 illustrates a block diagram of an optical line unit in the broadband fiber bank section.

FIG. 7 is a block diagram of optical line unit 60. Optical line unit 60 includes a cell bus interface controller 160, a clock recovery unit 162, a field programmable gate array 164, dual SONET physical layer interface units 166, a POTS gate array unit 168, a microcontroller unit 170, and memory 172. Cell bus interface controller 160 receives cell bus information from and transfers cell bus information to redundant cell routing units 64 over cell bus connections. The necessary synchronization and clock signals for the cell bus are provided by fiber bank interface unit 62. On the inbound side, cell bus interface controller 160 buffers and multiplexes cell bus information for transfer to programmable gate array 164. For the outbound side, cell bus interface controller 160 receives cell bus information from programmable gate array 164, buffers, and demultiplexes the cell bus information for placement onto the cell bus. Cell bus buffers 161 provide real time gunning transistor logic signal conversion for the cell bus.

Programmable gate array 164 includes a cell bus interface 180 to interface asynchronous transfer mode cell traffic between optical line unit 60 and cell routing units 64. Cell bus interface 180 typically expects data from both cell routing units 64 and selects one of them for input. The multiplexing function is controlled by active and protect control signals from fiber bank interface unit 62. Cell bus interface 180 transmits redundant data to both cell routing units 64. Though shown separately, cell bus buffers 161 and cell bus interface controller 160 may be incorporated into cell bus interface 180. Cell bus interface 180 provides a full duplex, a bit-wide data path to and from optical line unit 60. The data rate for cell bus interface 180 is selectable between 25 MHZ or 100 MHZ to support ECR 2-3 or ECR-12, respectively. Local cell array within optical line unit 60 is synthesized from the system cell bus clock. Cell bus interface 180 provides a minimal amount of buffering in both the upstream and downstream directions for rate adaptation.

Programmable gate array 164 also includes an asynchronous transmitter mode adaptation layer interface 182 that provides the means for converting telephony time division multiplexed data to and from asynchronous transfer mode cells. Telephony time division multiplexed data is received from and transferred to fiber bank interface unit 62 over an octal bus. The octal bus is full duplex and may operate at 16 Mbits per second in either direction. The octal bus contains eight subscriber bus interfaces. The two octal buses may be terminated per optical line unit 60 wherein one octal bus is used for a fiber bank datalink function. Asynchronous transfer mode adaptation layer interface 182 maps each subscriber bus interface of the octal bus into an appropriate asynchronous transfer mode cell format for transmission through a cell flow controller 184 and a utopia interface 186 to dual SONET physical layer interface 166.

An appropriate asynchronous transfer mode cell header and payload field is created for each cell destined for utopia interface 186. The header of the telephony asynchronous transfer mode cell created by asynchronous transfer mode adaptation layer interface 182 contains a valid time division multiplex macro address, containing GFC, VPI, VCI, PTI, and CLP fields. The HEC field is calculated and inserted by dual SONET physical layer interface 166. Header values are programmed by microcontrollers 170. For more information on the mapping of telephony traffic into and from asynchronous transfer mode cells, please refer to co-pending U.S. patent application Ser. No. 08/777,103, entitled "Method and Apparatus for Placing time Division Multiplexed Telephony Traffic into an Asynchronous Transfer Mode Format", which is hereby incorporated herein by reference. For an example of specific circuitry that maps telephony traffic to and from asynchronous transfer mode cells, please refer to co-pending U.S. patent application Ser. No. 08/978,969, entitled "Optical Network Unit for Communicating Telephony and Video Information", which is hereby incorporated by reference herein.

Thus, it is apparent that there has been provided, in accordance with the present invention, a telecommunications switch for providing telephony traffic integrated with video information services that satisfies the advantages set forth above. Although the present invention has been described in detail, it should be understood that various changes, substitutions, and alterations can be made herein. For example, though discussed in terms of video information generated by a video information provider, the present invention may equally be applicable to other types of packet data, including information from an information service provider in an Internet environment. Other examples are readily ascertainable to one skilled in the art and can be made herein without departing from the spirit and scope of the present invention as defined by the following claims.

What is claimed is:

1. A broadband fiber bank for a digital loop carrier system, comprising:

a first optical line unit operable to receive packet data traffic from an information service provider;

a fiber bank interface unit operable to receive subscriber telephony traffic from a telephony telecommunications network, the fiber bank interface unit operable to provide time slot interchange distribution of subscriber telephony traffic for multiple subscribers;

a routing unit operable to receive packet data traffic from the first optical line unit, the routing unit operable to provide distribution of the packet data traffic for multiple subscribers;

a second optical line unit operable to receive telephony voice traffic distributed from the fiber bank interface unit and packet data traffic distributed from the routing unit, the second optical line unit operable to place subscriber telephony traffic and packet data traffic into a common transport structure, the second optical line unit operable to transport the common transport structure carrying subscriber telephony traffic and packet data traffic over a single communication link.

2. The digital loop carrier system of claim 1, wherein packet data traffic is processed in asynchronous transfer mode cells, the second optical line unit operable to place subscriber telephony traffic received from the common control section in asynchronous transfer mode cells, and the second optical line unit operable to provide a stream of asynchronous transfer mode cells carrying packet data traffic and subscriber telephony traffic to the plurality of subscribers over the single communication link.

3. The broadband fiber bank of claim 1, wherein the common transport structure is an asynchronous transfer mode cell.

4. The broadband fiber bank of claim 1, wherein the single communication link is an optical fiber carrying subscriber telephony traffic and packet data traffic at an OC-n rate.

5. The broadband fiber bank of claim 1, wherein the first optical line unit is operable to receive packet data traffic in asynchronous transfer mode cells from an asynchronous transfer mode switching source.

6. The broadband fiber bank of claim 1, wherein the packet data traffic includes video information generated by a video information provider.

7. The broadband fiber bank of claim 1, wherein the second optical line unit is operable to receive the common transport structure carrying subscriber telephony traffic and packet data traffic over the single communication link from a plurality of subscribers, the second optical line unit operable to identify, separate, and extract subscriber telephony traffic carried in the common transport structure from packet data traffic carried in the common transport structure, the second optical line unit operable to transport telephony traffic to the fiber bank interface unit and packet data traffic to the routing unit.

8. A digital loop carrier system, comprising:

a common control section operable to provide subscriber telephony traffic received from a telephony telecommunications network; and broadband fiber bank including:
- a first optical line unit operable to receive packet data traffic from an information service provider;
- a fiber bank interface unit operable to receive subscriber telephony traffic from the common control section, the fiber bank interface unit operable to provide time slot interchange distribution for subscriber telephony traffic;
- a routing unit operable to receive packet data traffic from the first optical line unit, the routing unit operable to provide distribution for the packet data traffic;
- a second optical line unit operable to receive telephony voice traffic distributed from the fiber bank interface unit and packet data traffic distributed from the routing unit, the second optical line unit operable to place subscriber telephony traffic and packet data traffic into a common transport structure, the second optical line unit operable to transport the common transport structure carrying subscriber telephony traffic and packet data traffic over a single communication link.

9. The digital loop carrier system of claim 8, further comprising:
- a broadband channel bank operable to receive packet data traffic from the broadband fiber bank section, the broadband channel bank operable to provide packet data traffic to subscribers local to the digital loop carrier system separate from the single communication link.

10. The digital loop carrier system of claim 8, wherein the broadband fiber bank is operable to receive the common transport structure from the plurality of subscribers over the single communication link, the broadband fiber bank operable to identify and separate subscriber telephony traffic in the common transport structure from packet data traffic in the common transport structure, the broadband fiber bank operable to distribute packet data traffic to the information service provider and subscriber telephony traffic to the common control section.

11. A digital loop carrier system, comprising:
- a common control section operable to provide subscriber telephony traffic received from a telephony telecommunications network;
- a first optical line unit operable to receive packet data traffic from an information service provider;
- a fiber bank interface unit operable to received subscriber telephony traffic from the common control section, the fiber bank interface unit including a time slot interchange operable to provide distribution of the subscriber telephony traffic for multiple subscribers;
- a routing unit operable to receive packet data traffic from the firs optical line unit, the routing unit including a switch operable to provide distribution of the packet data traffic for multiple subscribers;
- a second optical line unit operable to receive telephony voice traffic distributed from the fiber bank interface unit and packet data traffic distributed from the routing unit, the second optical line unit operable to place subscriber telephony traffic and packet data traffic into a common transport structure, the second optical line unit operable to transport the common transport structure carrying subscriber telephony traffic and packet data traffic over a single communication link.

12. The digital loop carrier system of claim 11, wherein
the packet data traffic distributed from the routing unit comprises asynchronous transfer mode cells, and
the second optical line unit includes
- an asynchronous transfer mode adaptation layer interface operable to convert the telephony traffic to asynchronous transfer mode cells, and
- a cell controller operable to integrate the telephony traffic cells and the packet data traffic cells for transport over the single communication link.

* * * * *